Oct. 19, 1943.  J. O. REED  2,332,113
ANTISKID TIRE CHAIN
Filed Nov. 26, 1941
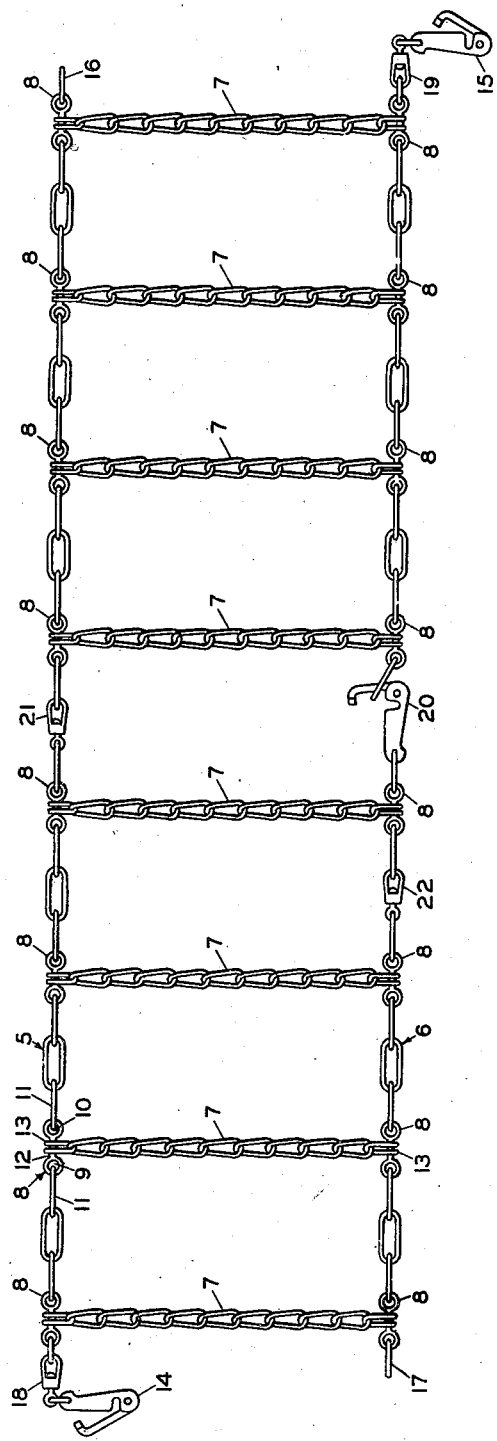
INVENTOR
Jesse O. Reed
BY
ATTORNEYS Patented Oct. 19, 1943

2,332,113

UNITED STATES PATENT OFFICE 2,332,113

ANTISKID TIRE CHAIN

Jesse O. Reed, Washington, D. C.

Application November 26, 1941, Serial No. 420,539

5 Claims. (Cl. 152—241)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to tire chains, such as those provided with flexible side chains and cross members, ordinarily used on the wheels of automobiles for anti-skidding purposes.

The general object of this invention is to provide improvements in a chain of the type mentioned which will make it easier and less confusing to use and apply.

Anti-skid devices of this type when not in use are generally placed haphazardly in some compartment of the vehicle, or in a garage, barn, or other place, as a result of which the links ordinarily become kinked so that when it is necessary to use them, it requires a great deal of time and patience to straighten them out. Such kinking results from one end of the anti-skid device being threaded through one or more of the loops formed by the side chains and cross members. Also, in applying the chain to a wheel, the various manipulations involved tend to cause kinking in the chain. The effect of kinking is to make the chain shorter and, if the original length of the chain is just sufficient to meet the size of the wheel, it is obvious that the chain must be free of kinks in order to fit the wheel and to be properly secured thereabout. One of the specific objects of this invention is the provision of such a chain which will not become kinked under ordinary circumstances so that it is always in condition ready to be used.

In the accompanying drawing, there is illustrated a preferred embodiment of my invention to which reference is made in the following description, and, considered together, a full understanding may be had by those skilled in the art. It will be apparent from this description and drawing that my invention embraces objects and advantages other than those mentioned above.

The drawing referred to is a diagrammatic plan view of the anti-skid device, constructed according to a preferred embodiment of my invention. The device is fabricated of the usual flexible side chains 5 and 6 and a plurality of spaced connecting cross members, such as chains 7. The connection between each end of the cross chains and the side chains 5 and 6 are such as to permit free rotation of each of the side chains at the points of connection relative to the ends of the cross chains. I prefer to accomplish this by means of a dumb-bell-shaped link 8 having eyes 9 and 10 at either end interposed in the side chains between the ordinary loop links 11 at each point of connection between the side chains and the cross chains. The shank 12 of each link 8 between the eyes 9 and 10 is cylindrical and engages the end loop links 13 of the cross chains, substantially as shown. This establishes a rotatable connection, such that rotation of the side chains will not affect the cross chains.

The side chains are provided with the usual fasteners 14 and 15 which are adapted to engage links 16 and 17, respectively, at the other ends of the side chains. I prefer to have the fasteners 14 and 15 at different ends of their respective side chains, so that in mounting the chain, it is impossible to connect two ends of the side chains together unless they belong to the same side chain. The fasteners 14 and 15 are connected to the ends of their respective side chains by means of swivels 18 and 19.

Although it does not form a part of the present invention, I prefer to have one of the two side chains in two sections, such as side chain 6, as illustrated, detachably connected by a fastener 20 so that the whole device can be easily and quickly attached to a wheel without raising it from the ground, or rotating it. With this arrangement I prefer to insert a swivel 21 in the other side chain 5 at a point between the same two cross members that are adjacent the fastener 20 to prevent kinking at this point due to rotation of one section of the device relative to the other. If desired, additional swivels may be inserted in the side chains between any two of the links 8, such as swivel 22, but ordinarily this will not be necessary unless both side chains are made in one section, and in such case it is preferred that such swivels be disposed in both side chains between consecutive links 8.

If during storage of my improved anti-skid device one end becomes threaded through a loop thereof, such as a loop adjacent an end, the ends of the side chains if not fastened will simply rotate through a full turn within the connections of the cross members positioned on the side of the loop next to that end. The swivel links do not then function to aid in removing the kinks, but if the ends of the side chains have been fastened without first removing the kinks, the swivels will function to aid in removing the kinks by permitting the necessary rotation of portions of the side chains.

The kinking of the side chains is troublesome only with antiskid devices in which the side members are flexible, that is, of such degree of flexibility that an end of the device will become threaded through one of the loops during storage. Side chains of ordinary link construction are of this nature. The term "flexible" as herein used is intended to define this degree of flexibility.

Having thus described my invention, I claim:

1. An anti-skid device comprising flexible side chains of link construction and cross members, the degree of flexibility of the side chains being such that the end of the device will, during storage, become threaded through the loops formed by the side chains and adjacent cross members at least one cross member adjacent an end of the device being connected at its ends to the side chains by connectors constructed to provide free rotation of each of the side chains at the points of connection relative to the ends of the said cross members, whereby kinking of the side chains, due to threading one end of the device through the loop formed by the side chains, the said cross member, and the cross member adjacent to it, is prevented.

2. An anti-skid device comprising flexible side chains of link construction and cross members, the degree of flexibility of the side chains being such that the end of the device will, during storage, become threaded through the loops formed by the side chains and adjacent cross members said cross members being connected at their ends to the side chains by connectors constructed to provide free rotation of each of the side chains relative to the ends of the cross members, whereby kinking of the side chains, due to threading one end of the anti-skid device through the loops formed by the side chains and cross members is prevented.

3. An anti-skid device comprising flexible side chains of link construction, detachable fasteners for securing the ends of each of the side chains together, cross members, the degree of flexibility of the side chains being such that the end of the device will, during storage, become threaded through the loops formed by the side chains and adjacent cross members at least one cross member adjacent an end of the anti-skid device being connected at its ends to the side chains by connectors constructed to provide free rotation of the side chains relative to the ends of the said cross member at the points of connection, and swivel links in each side chain located between the said cross member and the cross member on the remote end of the anti-skid device but adjacent to it when the side chains are fastened together, whereby the kinking of the side chains, due to threading one end of the anti-skid device through the loop formed by the said chains, the said cross member and the cross member adjacent to it, may be removed while the ends of the side chains are fastened together.

4. An anti-skid device comprising flexible side chains of link construction, detachable fasteners for securing the ends of each of the side chains together, cross members connected at their ends to the side chains by connectors constructed to provide free rotation of each of the side chains relative to the ends of the cross members, the degree of flexibility of the side chains being such that the end of the device will, during storage, become threaded through the loops formed by the side chains and adjacent cross members and at least one swivel link in each side chain, whereby the kinking of the side chains, due to threading one end of the anti-skid device through the loops formed by the side chains and cross members, may be removed while the ends of the side chains are fastened together.

5. An anti-skid device comprising a pair of flexible side chains of link construction, and cross members connected at their ends to the side chains, one of said side chains being in two sections and having a fastener for detachably connecting the adjacent ends of said sections, and the other side chain having a swivel therein at a point between the same two cross members that are adjacent said fastener.

JESSE O. REED.